United States Patent
Siddabathuni

(10) Patent No.: US 7,290,038 B2
(45) Date of Patent: Oct. 30, 2007

(54) KEY REUSE FOR RDMA VIRTUAL ADDRESS SPACE

(75) Inventor: Ajoy C. Siddabathuni, Fremont, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 1035 days.

(21) Appl. No.: 10/210,725

(22) Filed: Jul. 31, 2002

(65) Prior Publication Data

US 2004/0024833 A1   Feb. 5, 2004

(51) Int. Cl.
*G06F 15/167* (2006.01)

(52) U.S. Cl. ............... 709/212; 709/213; 709/215; 711/164

(58) Field of Classification Search ........... 709/212, 709/250, 213, 214, 215, 216; 711/164
See application file for complete search history.

(56) References Cited

U.S. PATENT DOCUMENTS

| | | | |
|---|---|---|---|
| 5,623,622 A * | 4/1997 | Yuki et al. ............... 711/100 |
| 6,611,883 B1 * | 8/2003 | Avery ........................ 710/22 |
| 6,947,970 B2 * | 9/2005 | Berry ....................... 709/212 |
| 7,124,170 B1 * | 10/2006 | Sibert ...................... 709/216 |
| 2003/0031183 A1 * | 2/2003 | Kashyap et al. ......... 370/395.2 |
| 2003/0046505 A1 * | 3/2003 | Craddock et al. ........... 711/165 |
| 2003/0093625 A1 * | 5/2003 | Beukema et al. ........... 711/147 |

* cited by examiner

*Primary Examiner*—William Vaughn
*Assistant Examiner*—Mohamed Ibrahim
(74) *Attorney, Agent, or Firm*—Park, Vaughan & Fleming LLP

(57) ABSTRACT

A system and method for reusing an R_Key associated with InfiniBand virtual address space mapped to local, host, storage. An R_Key is initially assigned by an HCA (Host Channel Adapter) when a host registers a set of local storage buffers. The HCA maps the local buffers to virtual address space and returns the R_Key. When the host augments the mapped local storage by identifying additional buffers, the HCA maps the larger storage area to virtual address space and returns the same R_Key. When the host removes local storage from the mapping scheme, the HCA returns a smaller virtual address space associated with the same R_Key.

23 Claims, 3 Drawing Sheets

KEY REUSE FOR RDMA VIRTUAL ADDRESS SPACE

BACKGROUND

This invention relates to the field of electronic communications. More particularly, a system and methods are provided for reusing a key associated with virtual address space for RDMA (Remote Direct Memory Access) operations. The system and methods are applicable to InfiniBand and other communication infrastructures that support RDMA.

InfiniBand is an input/output (I/O) technology for communicating between host devices (e.g., servers, computing nodes) and target devices (e.g., I/O modules, storage devices, communication links). The InfiniBand architecture defines a point-to-point switched "fabric" for interconnecting hosts and targets, and specifies various verbs, or functions, for establishing and maintaining communication connections between devices. Hosts are coupled to the InfiniBand fabric via Host Channel Adapters (HCA), while targets are coupled to the fabric with Target Channel Adapters (TCA).

InfiniBand technology enables the reassembly of data, by a target, directly into host buffers through RDMA. A host maps local buffers or storage space to virtual address space within the InfiniBand fabric by invoking verbs implemented by an HCA. The host then communicates to the target, out of band, the virtual address space to use for a particular communication connection between the host and the target. A TCA coupled to the target device maintains the state of the connection and performs RDMA to the host buffers via the specified InfiniBand virtual address space.

Verbs specified in the InfiniBand architecture allow a host (via an HCA) to set up a virtual address space for a communication connection and to add or remove host buffers to/from the virtual address space. For example, a host may invoke a first "register" function, while identifying a set of host buffers. In response, an HCA maps InfiniBand virtual address space to the host buffers, and returns an R_Key for identifying the virtual address space. The host may then pass the R_Key to a TCA, and the TCA will use the corresponding virtual address space for a specified connection by producing the R-Key as a ticket to access the space.

Other verb functions (e.g., "re-register", "de-register") allow the host to add and remove host buffers to and from a virtual address space. However, each time a host adds or removes buffers to/from an InfiniBand virtual address space, a different R_Key is returned by the HCA. As a result, the host must pass the new R_Key to the TCA, which must update its tables or state information for the communication connection. For applications involving the transfer of significant amounts of data (e.g., streaming media), the extra processing involved in handling constantly changing R_Keys can detract from a device's efficiency and throughput.

SUMMARY

In one embodiment of the invention, a system and methods are provided for enabling the reuse of an RDMA key. In this embodiment, when a host calls upon a communication interface (e.g., network interface circuit, channel adapter) to add host buffers to an existing virtual address space, or remove host buffers from an existing virtual address space, the interface returns the same key instead of a new one.

In an embodiment of the invention configured for an InfiniBand environment, an R_Key is initially assigned by an HCA when a host registers local storage space (e.g., physical or virtual) via a register command. The HCA maps the local storage space to InfiniBand virtual address space and returns the R_Key. When the host augments the mapped local storage with a re-register command identifying additional local storage space, the HCA maps the larger storage area to a larger virtual address space and returns the same R_Key. When the host removes local storage from the mapping scheme with a de-register command, the HCA returns a smaller virtual address space, but reports the same R_Key

DETAILED DESCRIPTION

Figure 1:
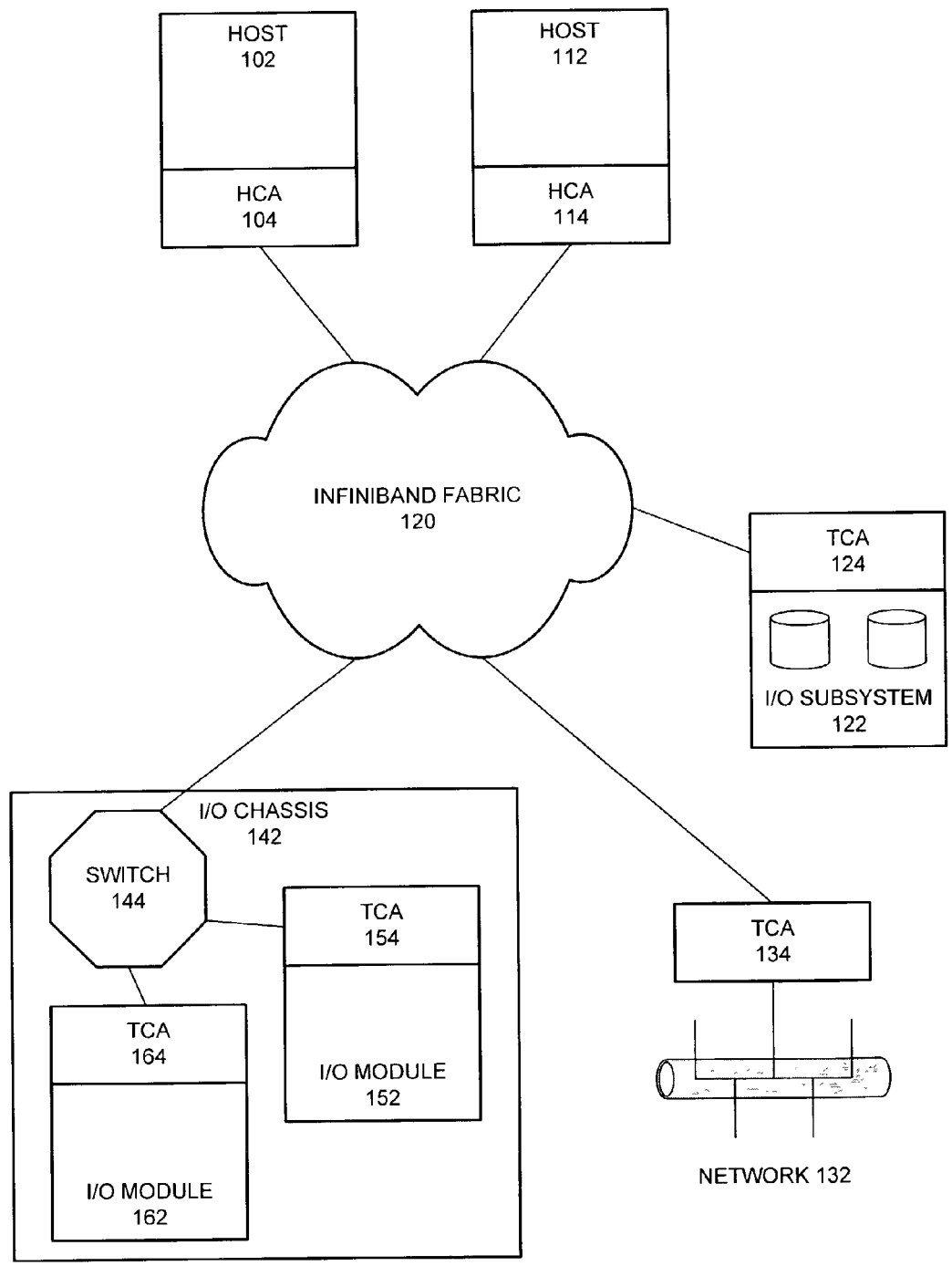
FIG. 1 is a block diagram depicting an InfiniBand communication system in which an embodiment of the present invention may be implemented.

The following description is presented to enable any person skilled in the art to make and use the invention, and is provided in the context of particular applications of the invention and their requirements. Various modifications to the disclosed embodiments will be readily apparent to those skilled in the art and the general principles defined herein may be applied to other embodiments and applications without departing from the scope of the present invention. Thus, the present invention is not intended to be limited to the embodiments shown, but is to be accorded the widest scope consistent with the principles and features disclosed herein.

The program environment in which a present embodiment of the invention is executed illustratively incorporates a general-purpose computer or a special purpose device such as an application server. Details of such devices (e.g., processor, memory, data storage, display) may be omitted for the sake of clarity.

It should also be understood that techniques of the present invention may be implemented using a variety of technologies. For example, methods described herein may be implemented in software executing on a computer system, or implemented in hardware utilizing either a combination of microprocessors or other specially designed application specific integrated circuits, programmable logic devices, or various combinations thereof. In particular, the methods described herein may be implemented by a series of computer-executable instructions residing on a suitable computer-readable medium. Suitable computer-readable media may include volatile (e.g., RAM) and/or non-volatile (e.g., ROM, disk) memory, carrier waves and transmission media (e.g., copper wire, coaxial cable, fiber optic media). Exemplary carrier waves may take the form of electrical, electromagnetic or optical signals conveying digital data streams along a local network, a publicly accessible network such as the Internet or some other communication link.

In one embodiment of the invention, a system and method are provided for enabling the reuse of R_Keys in an InfiniBand communication environment. The system and method may be adapted for use in other environments that support RDMA (Remote Direct Memory Access). In the InfiniBand implementation, an R_Key allows a Target Channel Adapter (TCA) of a target device to access, via RDMA, virtual address space allocated to a communication connection (e.g., a queue pair or QP) between the target device and a host device. A Host Channel Adapter (HCA) serving the host establishes or registers the virtual address space at the host's request.

Illustratively, one or more verbs defined by InfiniBand are extended to enable reuse of an R_Key. As one skilled in the art will recognize, a verb defines an interface between an HCA and a client of the HCA. Therefore, an API (Application Programming Interface) designed to implement a re-register verb may be constructed to return the same R_Key previously assigned to the virtual address space. Because the API operates as required by the InfiniBand specification, but reuses R_Keys, any client may use the services of an HCA that has been augmented with the extended verb(s).

In one embodiment of the invention, a host invokes a "register" verb of an HCA to register an initial set of host storage (e.g., memory buffers) with the InfiniBand fabric. The HCA maps the host storage to InfiniBand virtual address space and returns various details regarding the registration. In particular, the HCA returns an R_Key associated with the virtual address space. The R_Key may be used as a ticket or pass for using the virtual address space. The HCA also returns a description of the space, such as a starting virtual address and an ending virtual address or the size of the space. The HCA may also provide the host with a handle for identifying the virtual address space in later operations. The HCA's implementation of the register verb may mirror the InfiniBand specification or may be extended or augmented beyond the standard register verb.

To add additional local storage to registered virtual address space, the host may invoke an extended "re-register" verb implemented by the HCA. The re-register verb is extended in that it is configured to return the same R Key previously assigned to the virtual address space. The HCA will combine the additional host storage with the previous storage and map the combination to InfiniBand virtual address space. The newly added virtual address space may start at the same or a different address as the end of the previously mapped space, but should not overlap the previously mapped space. The HCA returns to the host the same R_Key.

To remove local storage from a registered virtual address space, the host invokes an extended "de-register" verb. The HCA will remove the specified local storage from the virtual address space and return a description of the smaller space (e.g., starting address, ending address, size).

In one embodiment of the invention, an HCA uses handles to identify the various sets or subsets of local storage added to an InfiniBand virtual address space mapping (e.g., during a register or re-register operation). A host may then use these handles to identify the local storage to the HCA for a de-register operation.

After configuring or re-configuring a virtual address space for RDMA operations, a host will identify the space to a target for use during a communication connection between the host and the target. Because the initial R_Key (i.e., assigned during a register operation) is reused, the target has less state information to maintain during the connection. Illustratively, the HCA does not tear down a virtual address space, or de-register an R_Key, until a host has removed all of its local storage that was mapped to the virtual address space.

FIG. 1 illustrates an InfiniBand communication environment in which an embodiment of the invention may be implemented. Hosts 102, 112 are coupled to respective HCAs 104, 114 for accessing InfiniBand fabric 120. A host may comprise a server (e.g., application server, web server, data server) or some other computing device comprising a processor and storage space (e.g., disk, memory). Storage buffers representing local physical and/or virtual storage within a host are mapped to virtual address space of the InfiniBand fabric to allow a target to perform RDMA operations to/from the host storage.

I/O subsystem 122, network 132 and I/O chassis 142 are InfiniBand targets. Each of I/O subsystem 122 and network 132 includes or is coupled to a corresponding TCA (i.e., TCAs 124, 134) for accessing fabric 120. Network 132 may comprise an organization's local or wide area network, or a publicly accessibly network such as the Internet. I/O chassis 142 includes InfiniBand compatible switch 144 and one or more I/O modules 152, 162. Each I/O module includes a corresponding TCA (i.e., TCAs 154, 164).

InfiniBand fabric 120 includes one or more switches and/or other communication devices (e.g., routers) and links for receiving, routing and delivering InfiniBand packets between targets and hosts.

For each communication connection in which it participates, a target in the environment of FIG. 1 may be configured to keep track of an R Key, the virtual address (VA) space it understands to be associated with the R_Key, and the size or length of the VA space. For example, host 102 may invoke the InfiniBand register verb implemented by HCA 104 to map a set of local memory buffers to VA space in fabric 120. HCA 104 will return an R_Key, a starting address of the mapped VA space and the length of the VA space. Host 102 may then transmit these details to TCA 134 to allow network 132 to perform RDMA operations on the local memory buffers.

In an embodiment of the invention, a target device may directly access (i.e., via RDMA) host or kernel buffers by writing to or reading from a virtual address mapped to the buffers. In addition, if an RDMA operation fails (e.g., due to a remote access violation), the data to be written (e.g., a packet) may be transmitted to the HCA via a SEND operation. In this case the host will handle the copying.

Figure 2:
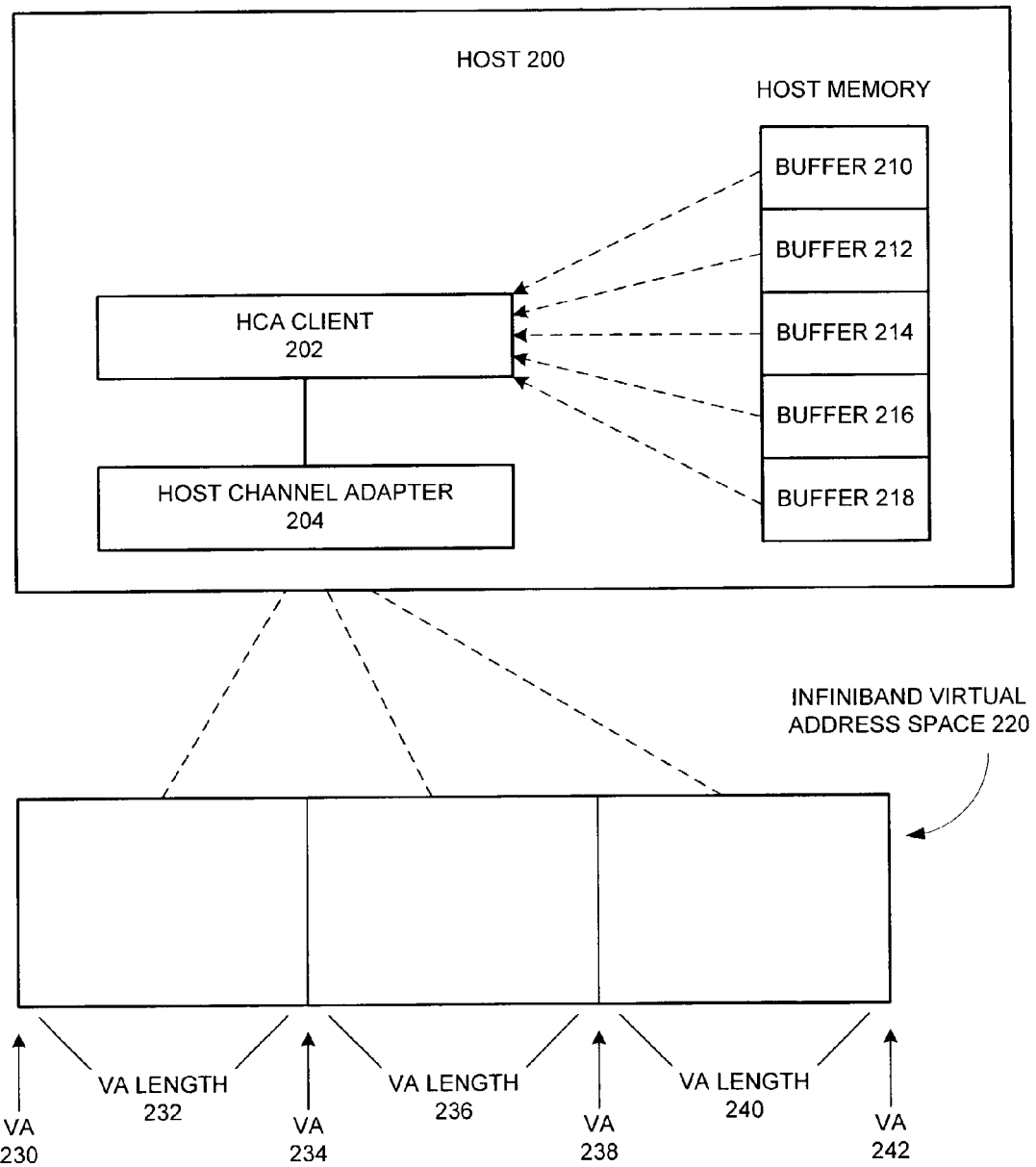
FIG. 2 is a block diagram demonstrating a configuration of a host device in accordance with an embodiment of the invention.

FIG. 2 depicts an illustrative host configured to implement an embodiment of the invention. In this embodiment, host 200 includes physical disk space and/or memory, represented as buffers 210-218. HCA client 202 may be a network driver, another device driver or some other host module that invokes the services of HCA 204 (e.g., through APIs) to access InfiniBand virtual address space 220.

Figure 3:
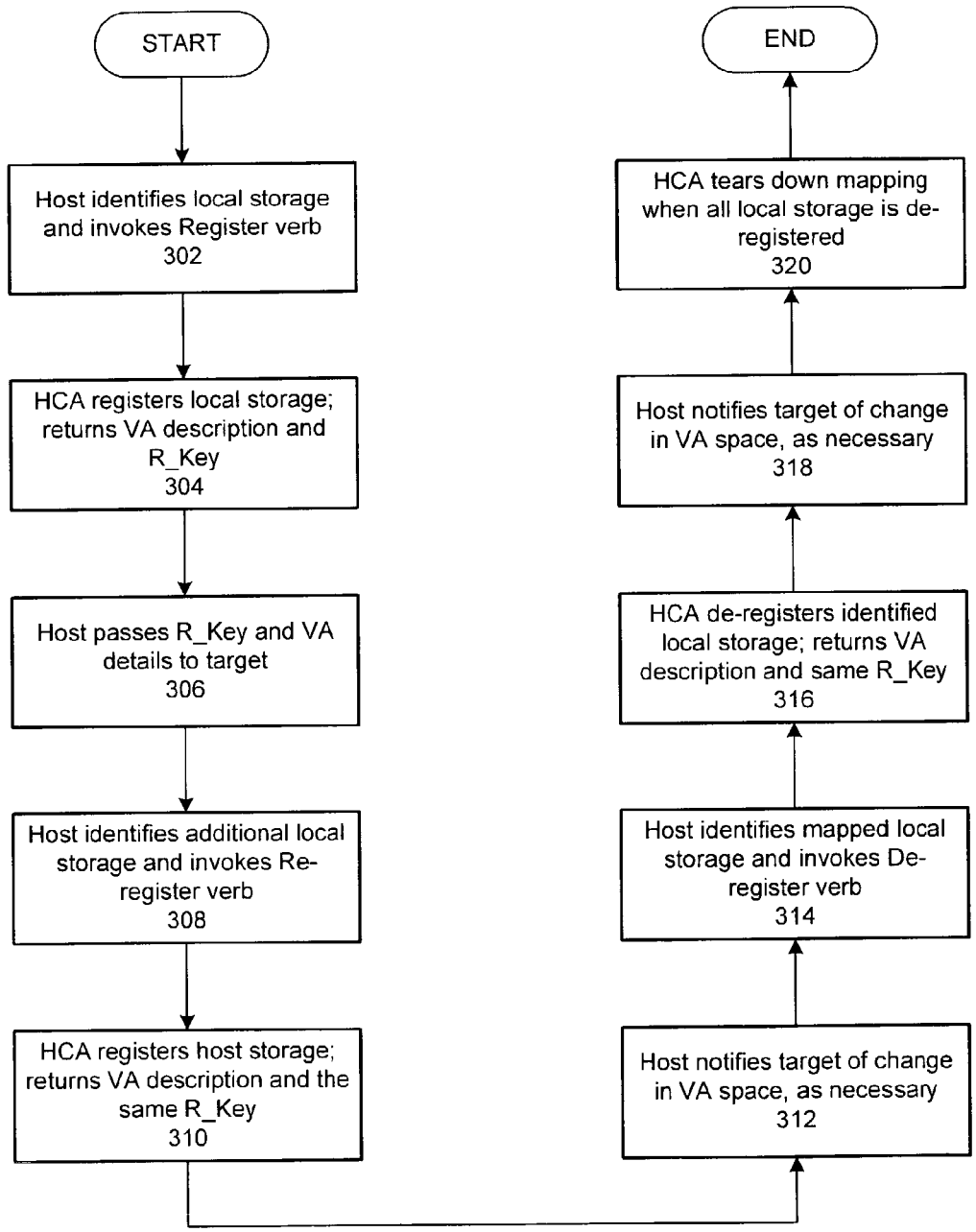
FIG. 3 is a flowchart illustrating one method of reusing an R_Key, in accordance with an embodiment of the invention.

FIG. 3 demonstrates a method of reusing an R_Key for facilitating target access to host memory in an InfiniBand communication environment, according to the embodiment of the invention depicted in FIG. 2.

In state 302 of FIG. 3, HCA client 202 identifies a set of host buffers (e.g., buffers 210, 212) and invokes a register verb or interface of HCA 204. In state 304, HCA 204 maps the host buffers to virtual address space within the InfiniBand fabric. Illustratively, HCA 204 recognizes the host buffers identified by the host and maps them to VA space starting at address VA 230 and ending at VA 234. HCA 204 returns to HCA client 202, in response to the register function, the values of VA 230 and VA length 232 (or ending address VA 234), plus an R_Key associated with the VA space. HCA 204 may also return a handle (e.g., a memory handle) associated with the host buffers.

In state 306, host 200 may then pass the R_Key and associated VA space details to a target device for use during a communication connection with that target.

In state 308, when HCA client 202 needs to add additional local storage for the connection, the client invokes a re-register verb and identifies one or more additional buffers (e.g., buffers 214, 216). In state 310, HCA 204 maps the additional buffers and returns to the client the starting VA (e.g., VA 230), the length of the modified VA space (e.g., VA length 232+VA length 236) and the same R_Key. The HCA thus associates the same R_Key with the larger VA space. HCA 204 may also return another handle for identifying the additional buffers. Although the HCA extends an already mapped VA space in this example, in other implementations the HCA may map an entirely different VA space (e.g., starting at a different address) during a re-register operation.

In state 312, the host may notify the target of the change in the VA space (e.g., new length, new ending address, new starting address). The host may also re-send the same R_Key.

In state 314, when HCA client 202 chooses to remove local buffers from the space allocated to the communication connection, it invokes a de-register verb and identifies the buffers to be removed (e.g., buffers 210, 212), possibly using a handle previously associated with them. In state 316, HCA 204 responds with the starting address of the resulting (smaller) VA space (e.g., VA 234) and the length of the mapped VA space (e.g., VA length 236). Thus, even when decreasing the amount of space allocated to a connection, the HCA will continue to use the same R_Key. As with the re-register operation, instead of just modifying an existing mapped virtual address space during a de-register operation, an HCA may map the smaller host storage area to an entirely different virtual address space.

In state 318, the host may notify the target of the changes to the VA space allocated for the connection (e.g., new starting address, new size, new ending address).

In state 320, when the last mapped host buffer is de-registered, or the communication connection is explicitly torn down, the HCA will un-map local storage and virtual address space and de-register the R_Key.

Thus, in an embodiment of the invention, an HCA's implementation of a register verb is extended to allow multiple contiguous or non-contiguous InfiniBand virtual address segments to be associated with one R_Key. Each virtual address segment is mapped to a contiguous section of host memory (physical or virtual). Host buffers to be registered (or re-registered or de-registered) may be required to begin or end on a page boundary recognized by the HCA. The re-register verb, in this embodiment, will add more host buffer space. A new virtual address segment added as a result of re-register verb should not overlap with a previously registered segment. The de-register verb will remove one or more virtual address segments from those associated with an R_Key.

Illustratively, an HCA will identify a memory handle for each set of buffers mapped to virtual address space (i.e., during a register or re-register operation). That memory handle may then be used in a de-register operation to identify the host buffers to be de-registered. Alternatively, an HCA client could identify the space to be de-registered by passing to the HCA the corresponding R_Key, starting virtual address and the size of the virtual address space (or the ending virtual address).

In an embodiment of the invention in which TCP segments transit the InfiniBand fabric, the reuse of an R_Key during re-registration operations can be made transparent to a target device by mapping the virtual address space to a TCP window. In particular, a host (e.g., an HCA client module) may set its TCP window (for a TCP connection with a target) based on the virtual address space to which local buffers have been mapped. Thus, when new local buffers are added to the virtual address space, the host could move or increase its window accordingly. And, as the TCP window slides over the mapped virtual address space, de-register operations may be conducted to remove used local buffers.

In another embodiment of the invention, a target informs a host as the virtual address space associated with an R_Key is filled. The host may remove (de-register) local buffers as they are filled, and add local buffers as needed. In this embodiment, the host may notify the target when the virtual address space it should use changes. Although different starting virtual addresses, and different ending addresses or virtual address space sizes, may be reported to the target, the same R_Key will be reported.

The foregoing descriptions of embodiments of the invention have been presented for purposes of illustration and description only. They are not intended to be exhaustive or to limit the invention to the forms disclosed. Accordingly, the above disclosure is not intended to limit the invention; the scope of the invention is defined by the appended claims.

What is claimed is:

1. A method of reusing an InfiniBand R_Key at a host channel adapter of a host device, comprising:
   mapping a host storage space to a first virtual address space;
   assigning an R_Key to said first virtual address space;
   implementing a de-register command at the host channel adapter, wherein said de-register command identifies a first portion of said host storage space;
   mapping a remaining portion of said host storage space to a second virtual address space, wherein said remaining portion comprises said host storage space minus said first portion, wherein said remaining portion has a different data size and a different virtual address space than the host storage space mapped to the first virtual address space;
   reusing said R_Key by re-assigning said R_Key to said second virtual address space instead of assigning a different R_Key to said second virtual address space; and
   returning said re-used R_Key.

2. The method of claim 1, wherein the virtual address space associated with the R_Key is allocated to a communication connection between the host device and a target device.

3. The method of claim 2, wherein:
   the communication connection is a TCP connection; and
   the host device sets a window size for the TCP connection to correspond to the host storage space mapped to the virtual address space associated with the R_Key.

4. The method of claim 2, wherein the virtual address space associated with the R_Key is used by a target device for remote direct memory access operations with the host device.

5. The method of claim 1, further comprising:
   initiating a first RDMA (Remote Direct Memory Access) operation to write a set of data to the host device; and
   if the first RDMA operation is aborted by the host device, transferring the set of data to the host device via a SEND operation.

6. The method of claim 1, further comprising:
implementing at the host channel adapter a re-register command identifying additional host storage space;
mapping a combination of said additional host storage space and said remaining portion of said host storage space to a third virtual address space; and
reusing said R_Key by re-assigning said R_Key to said third virtual address space instead of assigning a different R_Key to said second virtual address space.

7. A method of reusing an InfiniBand R_Key at a host including a host channel adapter, the method comprising:
implementing a register command at the host channel adapter for a first host storage space;
mapping said first host storage space to a first virtual address space;
associating an R_Key with said first virtual address space;
implementing a re-register command at the host channel adapter, wherein said re-register command identifies a second host storage space;
mapping a combination of said first host storage space and said second host storage space to a second virtual address space, wherein the combination has a different data size and a different virtual address space than the first host storage space mapped to the first virtual address space;
reusing said R_Key by re-associating said R_Key with said second virtual address space instead of associating a different R_Key with said second virtual address space; and
returning said re-used R_Key.

8. The method of claim 1, further comprising:
adjusting a TCP window, for a communication connection with a target device, to correspond to the virtual address space mapped to said R_Key.

9. The method of claim 1, further comprising:
transmitting said R_Key to a target channel adapter to enable the target channel adapter to perform remote direct memory access operations through virtual address space associated with said R_Key.

10. The method of claim 1, further comprising:
implementing a de-register command identifying said first host storage space;
mapping said second host storage space to a third virtual address space; and
reusing said R_Key by re-associating said R_Key with said third virtual address space instead of associating a different R_Key with said second virtual address space.

11. An apparatus for reusing an R_Key in an InfiniBand communication environment, comprising:
a communication link coupling a host device to a target device;
a host channel adapter configured to interface the host device with said communication link; and
a set of functions, executable by said host channel adapter, for mapping local storage of the host device to virtual address space addressable by the target device;
wherein said functions are configured to reuse an R_Key to associate portions of said virtual address space allocated to a first communication connection between the host device and the target device when different local storage of the host device is mapped to virtual address space allocated to the first communication connection; and
wherein the different local storage of the host device has a different data size and a different virtual address space than the initial allocated virtual address space.

12. The apparatus of claim 11, wherein said set of functions includes a register function configured to:
map a first local storage space to a first portion of said virtual address space; and
assign said R_Key to said first portion.

13. The apparatus of claim 12, wherein said set of functions includes a de-register function configured to:
de-map a subset of said first local storage space from said first portion;
map the remainder of said first local storage space to a second portion of said virtual address space; and
reuse said R_Key by re-assigning said R_Key to said second portion.

14. The apparatus of claim 12, wherein said set of functions includes a re-register function configured to:
map a combination of a second local storage space and said first local storage space to a second portion of said virtual address space; and
reuse said R_Key by re-assigning said R_Key to said second portion.

15. The apparatus of claim 14, wherein said set of functions includes a de-register function configured to:
de-map a part of said combination of said second local storage space and said first local storage space from said second portion;
map the remainder of said combination of said second local storage space and said first local storage space to a third portion of said virtual address space; and
reuse said R_Key by re-assigning said R_Key to said third portion.

16. A computer readable storage medium storing instructions that, when executed by a computer, cause the computer to perform a method of reusing an InfiniBand R_Key at a host including a host channel adapter, the method comprising:
implementing a register command at the host channel adapter for a first host storage space;
mapping said first host storage space to a first virtual address space;
associating an R_Key with said first virtual address space;
implementing a re-register command at the host channel adapter, wherein said re-register command identifies a second host storage space;
mapping a combination of said first host storage space and said second host storage space to a second virtual address space, wherein the combination has a different data size and a different virtual address space than the first host storage space mapped to the first virtual address space;
reusing said R_Key by re-associating said R_Key with said second virtual address space instead of associating a different R_Key with said second virtual address space; and
returning said re-used R_Key.

17. A computer readable storage medium storing instructions that, when executed by a computer, cause the computer to perform a method of reusing an InfiniBand R_Key at a host channel adapter of a host device, the method comprising:
mapping a host storage space to a first virtual address space;
assigning an R_Key to said first virtual address space;
implementing a de-register command at the host channel adapter, wherein said de-register command identifies a first portion of said host storage space;
mapping a remaining portion of said host storage space to a second virtual address space, wherein said remaining portion comprises said host storage space minus said first portion, wherein said remaining portion has a different data size and a different virtual address space than the host storage space mapped to the first virtual address space;

reusing said R_Key by re-assigning said R_Key to said second virtual address space instead of assigning a different R_Key to said second virtual address space; and returning said re-used R_Key.

18. A method of reusing an InfiniBand R_Key at a single channel adapter of a host computer, comprising at the single channel adapter:

implementing a register command for a first host storage area;

mapping said first host storage area to a first virtual address space;

assigning an R_Key to said first virtual address space;

implementing a re-register command identifying a second host storage area;

mapping a third host storage area comprising said first host storage area and said second host storage area to a second virtual address space, wherein the third host storage area has a different data size and a different virtual address space than the first host storage space mapped to the first virtual address space;

reassigning said R_Key to said second virtual address space;

implementing a de-register command identifying a portion of said third host storage area;

mapping to a third virtual address space the difference between said third host storage area and said portion of said third host storage area;

reassigning said R_Key to said third virtual address space; and returning said re-assigned R_Key.

19. A computer readable storage medium storing instructions that, when executed by a computer, cause the computer to perform a method of reusing an InfiniBand R_Key at a single channel adapter of a host computer, the method comprising at the single channel adapter:

implementing a register command for a first host storage area;

mapping said first host storage area to a first virtual address space;

assigning an R_Key to said first virtual address space;

implementing a re-register command identifying a second host storage area;

mapping a third host storage area comprising said first host storage area and said second host storage area to a second virtual address space, wherein the third host storage area has a different data size and a different virtual address space than the first host storage space mapped to the first virtual address space;

reassigning said R_Key to said second virtual address space;

implementing a de-register command identifying a portion of said third host storage area;

mapping to a third virtual address space the difference between said third host storage area and said portion of said third host storage area;

reassigning said R_Key to said third virtual address space; and returning said re-assigned R_Key.

20. A host channel adapter for interfacing a host device with an InfiniBand communication environment, comprising:

a register function configured to make host storage available for remote direct memory access by a target device in a communication connection by:
 mapping a host storage area to an initial virtual address space; and
 associating an R_Key with said initial virtual address space;

a re-register function configured to increase the amount of host storage available for remote direct memory access in said communication connection by:
 mapping a combination of said host storage area and other host storage to a larger virtual address space, wherein the larger virtual address space has a different data size than the said host storage area; and
 reusing said R_Key by re-associating said R_Key with said larger virtual address space instead of associating a different R_Key; and a de-register function configured to decrease the amount of host storage available for remote direct memory access in said communication connection by:
 un-mapping a subset of a given host storage area mapped to virtual address space for said communication connection;
 re-mapping the remainder of said given host storage area to a smaller virtual address space; and
 reusing said R_Key by re-associating said R_Key with said smaller virtual address space instead of associating a different R_Key.

21. The host channel adapter of claim 20, wherein said R_Key is passed to the target device with a description of virtual address space associated with said R_Key.

22. The host channel adapter of claim 21, wherein said description comprises a starting virtual address.

23. The host channel adapter of claim 21, wherein said description comprises a size of a first virtual address space.

* * * * *